United States Patent [19]
Miller et al.

[11] Patent Number: 5,700,141
[45] Date of Patent: Dec. 23, 1997

[54] PILOT MODULE ASSEMBLY

[75] Inventors: Scott Miller, Butler; Don Brady; Steven Williamson, both of Wayne; Steven Luftig, Oakland; Dominick Musto, Middlesex, all of N.J.

[73] Assignee: Symtron Systems, Inc., Fair Lawn, N.J.

[21] Appl. No.: 549,955

[22] Filed: Oct. 30, 1995

[51] Int. Cl.⁶ ........................................ F23Q 2/32
[52] U.S. Cl. .................. 431/125; 431/2; 431/202; 431/264; 431/260; 431/252; 434/226
[58] Field of Search .................... 431/4, 252, 263, 431/264–265, 266, 260, 2, 125, 202; 434/226

[56] References Cited

U.S. PATENT DOCUMENTS

| | | | |
|---|---|---|---|
| 2,493,743 | 1/1950 | Benson | 60/39.827 |
| 3,548,592 | 12/1970 | Hopkins | 60/39.827 |
| 3,581,141 | 5/1971 | Beaubier . | |
| 4,303,396 | 12/1981 | Swiatosz | 434/226 |
| 4,861,270 | 8/1989 | Ernst et al. | 434/226 |
| 4,983,124 | 1/1991 | Ernst et al. | 434/226 |
| 5,052,933 | 10/1991 | Rogers et al. | 434/226 |
| 5,181,851 | 1/1993 | Layton et al. | 434/226 |
| 5,233,869 | 8/1993 | Rogers et al. | 434/226 |
| 5,328,375 | 7/1994 | Rogers et al. | 434/226 |
| 5,374,191 | 12/1994 | Herman et al. | 434/226 |
| 5,415,551 | 5/1995 | Semenza | 434/226 |
| 5,447,437 | 9/1995 | Joynt et al. | 434/226 |
| 5,509,807 | 4/1996 | Joice et al. | 434/226 |
| 5,573,394 | 11/1996 | Pershina | 431/258 |

Primary Examiner—Carl D. Price
Attorney, Agent, or Firm—Richard T. Laughlin, Esq.; Graham, Curtin & Sheridan

[57] ABSTRACT

An ignitor unit for an aircraft fuel spill simulator having an ignitor sparkplug without an air gap, a closed end cylinder having a top end wall with a hole receiving the ignitor sparkplug and having a peripheral wall with an inlet branch connection, a fuel line having an orifice element with a plurality of outlet holes disposed near to the ignitor spark plug, and an air line having an outlet orifice disposed adjacent to the ignitor sparkplug for allowing the blowing of air on the outlet orifice.

12 Claims, 1 Drawing Sheet

PILOT MODULE ASSEMBLY

FIELD OF THE INVENTION

The invention generally relates to an ignition system for a fighting trainer simulator, and in particular, the invention relates to a self-igniting pilot assembly for a fire fighting trainer.

BACKGROUND OF THE INVENTION

The prior art fire fighting trainers are disclosed in a number of United States patents, such as U.S. Pat. No. 4,861,270, issued to Ernst, et al. on Aug. 29, 1989; U.S. Pat. No. 4,983,124, issued to Ernst, et al. on Jan. 8, 1991; U.S. Pat. No. 5,052,933, issued to Rogers, et al. on Oct. 1, 1991; U.S. Pat. No. 5,415,551, issued to Semenza on May 16, 1995; U.S. Pat. No. 5,233,869 issued to Rogers, et al. on Aug. 10, 1993; and U.S. Pat. No. 5,181,851 issued to Layton, et al. in January 1993.

The prior art fire fighting trainer generally include a mockup of a typical firefighting scene such as an aircraft, a house, a warehouse, a ship or the like, a liquid fuel distribution system, a burner system having a liquid fuel supply line and having a burner control connected to the liquid fuel supply line, a central control connected to the burner control and an igniting system.

One problem with the prior art fire fighting trainer is that the ignition system has a tendency to become disabled because of debris and extinguishments, making malfunction a common occurrence.

SUMMARY OF THE INVENTION

One object of the invention is to provide a fire fighting trainer which has a safe and reliable ignitor unit for safe fuel ignition and control. Another object of the invention is to provide a system which is not readily fouled by combustible materials. Other objects and the advantages of the invention will appear from the following detailed description.

According to the present invention, a pilot assembly is provided having a self-igniting continuous pilot flame device which can be used to reliably ignite combustible fuel supplies. The unit comprises an ignitor to electronically light the pilot flame, a fuel distribution line to disperse the pilot fuel, and an air distribution line to provide high velocity air to keep the ignitor tip free of debris. All of the components are built into a modular assembly. It is essential to the invention that the horizontal angle of the ignitor be controlled so that it can function without contamination.

The ignitor creates a spark which then directly ignites the pilot flame. The energy source for the ignitor is provided remotely by a separate module and the spark itself is produced by the ignitor with a turbine engine type sparkplug. This type of plug has no air gap between electrodes so there is virtually no chance that foreign materials will bridge the ignitor gap and prevent operation. The ignitor is essentially self-cleaning due to the high energy of the spark produced. The ignitor is mounted in a cap which is easily removed for component replacement or wiring. This cap is positioned on top of the upright member of a pipe weldment mounted at a steep angle. This configuration allows water and extinguishants to roll off of the ignitor surface, thereby prolonging component life and improved reliability.

The fuel distribution line consists of a rectangular-shaped element with small holes provided to spray fuel toward the ignitor. The holes face downward which helps disperse the fuel into the dispersion medium and also prevents water from collecting in the element. The air distribution line consists of a nozzle mounted adjacent to the ignitor tip. The air line is connected to a regulated remote air source which supplies a constant flow of clean, compressed air. This air flowing past the ignitor tip helps keep the ignition area clear of debris, particularly extinguishments. It also provides oxygen to aid in the combustion process and prevents the local air/fuel mixture from becoming too rich.

The unit is usually positioned in a fuel spill pit containing water or similar liquid or stone aggregates or other dispersion media, or a combination of both water and stone aggregates. Only the upper surface of the assembly is exposed to view. The pilot assembly can have a configuration for operation in either a dry condition or when partially submerged configuration such as in water.

The pilot module assembly is operated remotely via a computer or electro-mechanical operator console. Upon pilot command, an electrical signal is sent to the ignitor, and a continuous spark is produced. At the same time a fuel valve is opened and fuel flows out of the holes in the fuel distribution line element. This fuel mixes with air and is subsequently ignited by the spark. A thermal sensor is used to verify that the pilot flame is lit. Once the pilot flame is confirmed, the spark is turned off.

BRIEF DESCRIPTION OF THE DRAWINGS

The invention is illustrated in the accompanying drawings wherein.

DESCRIPTION OF THE PREFERRED EMBODIMENT

Figure 1:
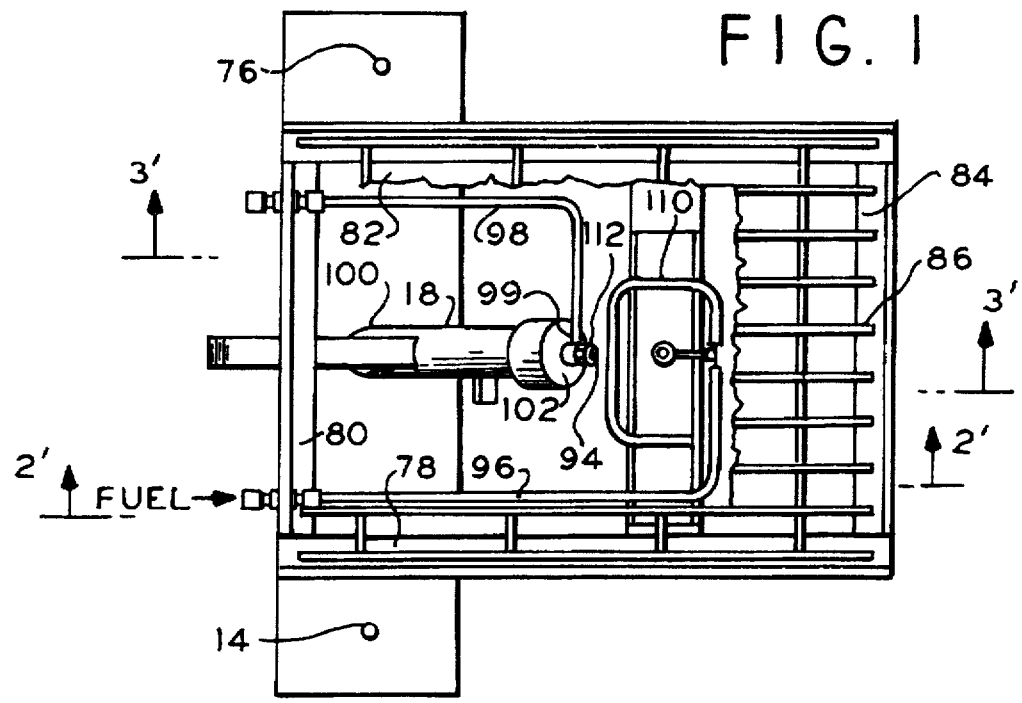
FIG. 1 is a top elevation view of a pilot assembly according to the present invention.
Figure 2:
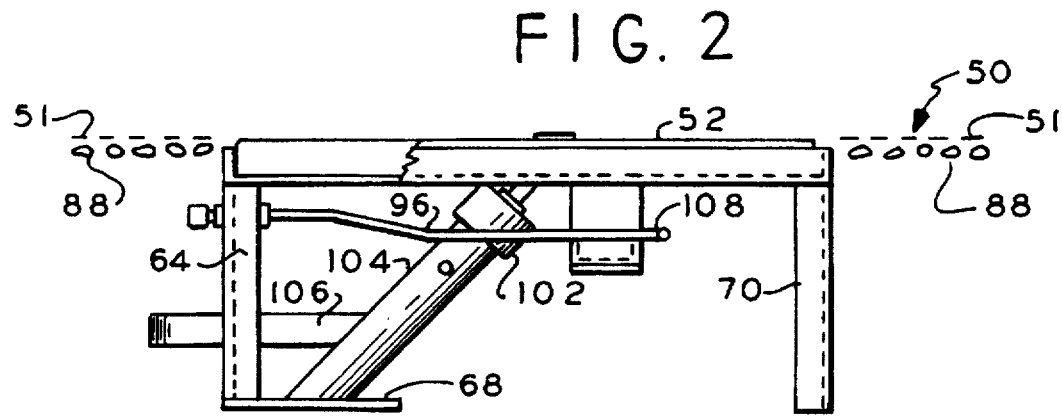
FIG. 2 is a side view as taken along the line 2—2 of FIG. 1.
Figure 3:
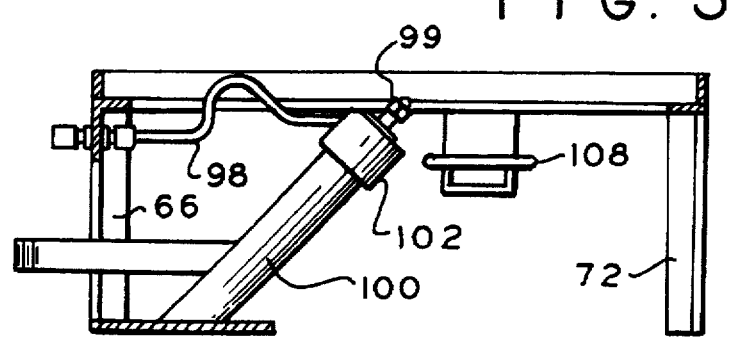
FIG. 3 is a section view as taken along the line 3—3 of FIG. 1.

As shown in FIGS. 1 through 3, a pilot module assemble 18 for use in fire fighting simulator or trainers has a steel frame 52 with two left side legs 64, 66 which have a common baseplate 68. The frame 52 also has two right side legs 70, 72. The baseplate 68 is secured with two anchor bolts 74, 76. The frame 52 also has four top angles 78, 80, 82, 84 and has a grating 86 which is supported by the angles 78, 80, 82, 84. The top of grating 86 is about level with the adjacent grade.

Module unit 18, which is supported by the frame 52, has an ignitor plug 94, a fuel distribution line 96, an air distribution line 98 and a pipe weldment cylinder 100. The weldment cylinder 100 is positioned at an angle to the horizontal to resist fouling. A suitable angle is about 15 to 80 degrees and preferably 40 to 55 degrees.

The weldment 100 has an end wall cap 102, an upright member 104 and a horizontal inlet member 106. The cap 102 is threaded onto upright the member 104 at its upper end. The walls can be seal welded to the base plate 68 at its lower end.

The fuel distribution line 96 has a rectangularly shaped element 108 which has a plurality of lower side outlet holes 110.

The air distribution line 98 has a nozzle or elbow 112 which is attached or banded to ignitor 94. The outflow from the nozzle 112 and the ignitor plug 94 are about parallel and in the same direction.

The pilot module assembly 18, is a self-igniting, continuous pilot flame device, for use to reliably ignite combustible fuel supplies. It can be used, as an illustration, in a fuel spill simulation pit or reservoir generally indicated at 50. The pit is filled with a mixture of water 51 and sand or stone gravel 88 or the like. The ignitor plug 94 is used to electronically light the pilot flame, fuel distribution line 96 to disperse the pilot fuel and air distribution line 98 to provide high velocity air to keep the ignitor tip clean. All of these components are built into modular assembly 18.

The module assemble device 18 is designed to be used in a fuel spill fire training simulator. It is positioned in the fuel spill pit 50 under stone aggregates 88 or sand or other dispersion media such as water 51 with only the upper surface of the assembly exposed to view. The pilot module assembly 14 can be operated in either a dry or partially water submerged configuration.

The ignitor 94 creates a spark which then directly ignites the pilot flame. The energy source for the ignitor 94 is provided remotely by a separate module (not shown) and the spark itself is produced by the ignitor 94 such as a turbine engine type sparkplug. This type of plug has no air gap between the electrodes so there is virtually no chance that foreign materials will bridge the ignitor gap and prevent operation. The ignitor 94 is essentially self-cleaning due to the high energy of the spark produced. The ignitor 94 is mounted in a the cap 102 which is easily removed for component replacement or wiring. This cap is positioned on top of the upright member 100 mounted at a steep angle with the horizontal. This configuration allows water and extinguishments to roll off the ignitor surface, thereby prolonging component life and improving reliability.

The fuel distribution line 96 consists of a rectangular-shaped element 110 with small holes 108 provided to spray fuel toward the ignitor. The holes 108 face downward which helps disperse the fuel into the dispersion medium 88 and also prevents water from collecting in the element. This fuel distribution line is connected to a controlled, remote fuel source (not shown).

The air distribution line 98 has a nozzle mounted 99 adjacent to the ignitor 112. The airline is connected to a regulated remote air source (not shown) which supplies a constant flow of clean, compressed air. This air flowing past the ignitor tip helps keep the ignition area clear of debris, particularly extinguishments. It also provides oxygen to aid in the combustion process and prevents the local air/fuel mixture from becoming too rich.

The frame 52 of the module 18 mounts to the base of the fuel spill pit 50. The base of the frame 52 contains an ignitor housing (not shown) which has a fitting to connect to an electrical conduit. The top of the module holds the piece of grating 86 which serves to protect the unit from damage. The frame 52 also has provisions for mounting the fuel distribution line 96, air distribution line 98 and a thermal sensor (not shown).

The pilot module assembly is operated remotely by way of the computer or electro-mechanical operator console 16. Upon pilot command, an electrical signal is sent to the ignitor 94, and a continuous spark is produced. At the same time, a fuel valve (not shown) is opened and fuel flows out of the holes 110 in the fuel distribution line element 108. This fuel mixes with air and is subsequently ignited by the spark. A thermal sensor (not shown) is used to verify that the pilot flame is lit. Once the pilot flame is confirmed, the spark is turned off.

The addition of compressed air and the steep mounting angle of the ignitor plug 94 improves the performance of assembly 18. The steep mounting angle and continuous air supply keep the burn area clear of debris and extinguishments. Extinguishment foams are particularly difficult to disperse from the pilot area due to their physical consistency. These foams form a thin film around the fuel as it escapes from the fuel distribution line element 106 and prevents the fuel from mixing with the surrounding air, which in turn prevents the pilot flame from lighting. The air from the air distribution line element 112 helps clear the foam away from the local burn area and breaks any foam bubbles, thereby mixing air with the fuel. The air also helps keep the ignitor tip cool and dry which improves reliability.

The advantages of the invention include:

1. The ability to operate in either wet or dry environment. The pilot module assembly is designed to operate in a partially submerged environment.

2. The ability to use a variety of fuels including propane.

3. Mounting the pilot module assembly paretically submerged in water helps protect the components from damage. The water directs flame impingement on most of the components, and acts as a large hear sink to help cool the components above the surface of the water.

4. The use of compressed air helps keep the combustion area free of debris. Extinguishant foams are particularly difficult to disperse from the pilot area due to physical consistency. These foams form a thin film around the fuel as it escapes from the water and can prevent the fuel from mixing with the surrounding air, which in turn prevent the pilot flame from lighting.

5. The use of compressed air aids the combustion process by mixing with the fuel and preventing an overly rich condition.

While the invention has been described as being utilized with a fire fighting trainer for an aircraft oil spill, it has application in all types of trainers such as houses, warehouses, ships and the like.

While the invention has been described in its preferred embodiment, it is to be understood that the words which have been used are words of description rather than limitation and that changes may be made within the purview of the appended claims without departing from the true scope and spirit of the invention in its broader aspects.

What is claimed is:

1. An igniter assembly for an aircraft fuel spill simulator comprising:

a reservoir to receive a volume of dispersion medium on the surface of which fuel burns;

an igniter unit located within the reservoir comprising a closed end cylinder positioned at an angle of from about 15 to 80 degrees from the horizontal having a top end wall and a peripheral wall;

an igniter sparkplug without an air gap;

a hole located in the top end wall of the closed end cylinder for receiving the igniter sparkplug;

a fuel line having an orifice element with a plurality of outlet holes disposed near the igniter spark plug to allow a spray of fuel towards the igniter sparkplug; and an air line having an outlet orifice disposed adjacent to the igniter sparkplug for allowing the blowing of air on the outlet orifice to keep extinguishment clear of the area of ignition and control the fuel-air mixture.

2. The ignitor assembly as defined in claim 1 wherein the unit is positioned at an angle of from about 40 to about 55 degrees from the horizontal.

3. The ignitor assembly of claim 1, wherein the airline outlet orifice has an axis, which is disposed about parallel to an outlet axis of the ignitor sparkplug.

4. The ignitor assembly of claim 3, wherein the fuel line orifice element is formed in an rectangular shape and a plurality of outlet holes are on the underside of the fuel line orifice element.

5. The ignitor assembly of claim 4, wherein the air line outlet orifice is disposed about parallel to and adjacent to the ignitor spark plug.

6. The ignitor assembly of claim 4, wherein the fuel line having an orifice element with a plurality of outlet holes disposed near the ignitor spark plug, and an air line having an outlet orifice disposed adjacent to the ignitor spark plug.

7. The igniter assembly as defined in claim 1, wherein the fuel line outlet orifice opens downward to aid the dispersion of the pilot fuel in the dispersion media.

8. The igniter assembly as defined in claim 1, wherein a cap is affixed to the cylinder to cover the sparkplug.

9. The igniter assembly as defined in claim 1, wherein a grating covers the igniter unit.

10. The igniter unit as defined in claim 1, wherein only an upper portion of the igniter unit is exposed above the dispersion medium.

11. The igniter unit as defined in claim 1, wherein the dispersion medium is water.

12. The igniter unit as defined in claim 1, wherein the dispersion medium is a mixture of water and sand or stone gravel.

* * * * *